United States Patent
Carter et al.

(10) Patent No.: US 9,055,129 B2
(45) Date of Patent: Jun. 9, 2015

(54) AUTOMATION FRAMEWORK TO REMOTELY CONTROL DEVICES AND PROCESS ASYNCHRONOUS EVENTS

(71) Applicant: Hulu, LLC, Santa Monica, CA (US)

(72) Inventors: Andrew Sherman Carter, Issaquah, WA (US); Myul Ryul Jang, Renton, WA (US); Dallas Stephan Mahrt, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 249 days.

(21) Appl. No.: 13/868,416

(22) Filed: Apr. 23, 2013

(65) Prior Publication Data

US 2013/0282916 A1    Oct. 24, 2013

Related U.S. Application Data

(60) Provisional application No. 61/637,172, filed on Apr. 23, 2012.

(51) Int. Cl.
*H04L 29/06* (2006.01)
*H04N 21/00* (2011.01)

(52) U.S. Cl.
CPC ............ *H04L 65/60* (2013.01); *H04L 65/4084* (2013.01); *H04L 65/601* (2013.01); *H04N 21/00* (2013.01)

(58) Field of Classification Search
CPC ... H04L 65/60; H04L 65/601; H04L 65/4084; H04N 21/00
See application file for complete search history.

(56) References Cited

U.S. PATENT DOCUMENTS

| | | | |
|---|---|---|---|
| 6,697,569 B1* | 2/2004 | Gomez et al. | 386/201 |
| 7,330,875 B1* | 2/2008 | Parasnis et al. | 709/204 |
| 8,356,251 B2* | 1/2013 | Strober | 715/740 |
| 8,935,424 B2* | 1/2015 | Bouazizi | 709/231 |
| 2002/0083182 A1* | 6/2002 | Alvarado et al. | 709/231 |
| 2002/0147634 A1* | 10/2002 | Jacoby et al. | 705/14 |
| 2003/0009452 A1* | 1/2003 | O'Rourke et al. | 707/3 |
| 2003/0061305 A1* | 3/2003 | Copley et al. | 709/217 |
| 2005/0262187 A1* | 11/2005 | Klemets | 709/203 |

OTHER PUBLICATIONS

"Advanced Systems Format (ASF) Specification," Microsoft Corporation, Dec. 2004, Revision 01.20.03, whole document.*

* cited by examiner

*Primary Examiner* — Thomas Dailey
(74) *Attorney, Agent, or Firm* — Brian N. Young; Fountainhead Law Group PC

(57) ABSTRACT

In one embodiment, a script starts automatic control of a remote device. The script issues a command to the device. The script causes a marker to be set at a position in an event buffer. The marker indicates events generated by the device should be stored in the event buffer. The action performed by the device results in events being asynchronously sent to the event buffer where the events are stored in the event buffer. The script initiates a wait for routine that waits for a target event to occur before execution of the script can continue and receives the events from the event buffer where the events are stored in the event buffer. The events are analyzed to determine if the target event occurred to allow the script to continue execution where the target event was stored in the event buffer before initiating the wait for routine.

20 Claims, 12 Drawing Sheets

```
module Bender::Message::Event

# === Description
    # The current playback progress of the device
    #
    # === Event Data
    # content_id:: [String] the deejay content ID that is
currently playing
    # current_position:: [Integer] the current number of
milliseconds into the video
    #
    class PlaybackProgressOccurred <
Bender::Message::EventBase
      define_event :playback_progress_occurred
      event_data :content_id
      event_data :current_position
    end
```

202 — define_event :playback_progress_occurred
204 — event_data :content_id
206 — event_data :current_position

FIG. 2

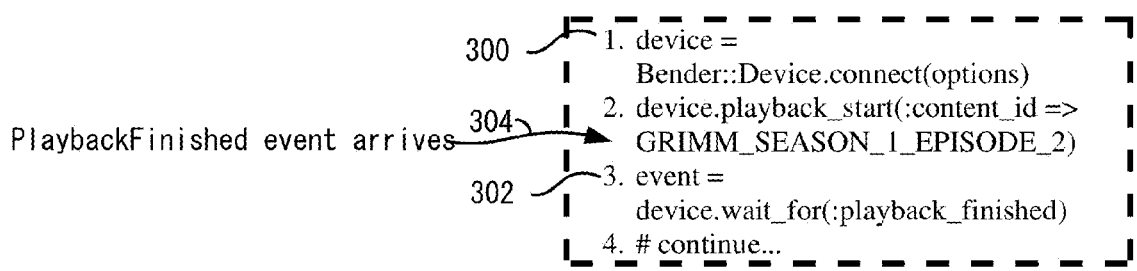

PlaybackFinished event arrives —304

300 — 1. device =
   Bender::Device.connect(options)
2. device.playback_start(:content_id =>
   GRIMM_SEASON_1_EPISODE_2)
302 — 3. event =
   device.wait_for(:playback_finished)
4. # continue...

FIG. 3

```
1. device = Bender::Device.connect(options)
2. markerA = device.set_marker
3. device.playback_started(:content_id =>
   GRIMM_SEASON_1_EPISODE_2)
4. device.seek(30000)
5. device.complicated_operation
6. device.wait_for(Bender::Message::Event::PlaybackFinished,
   :timeout => 30000, :marker => markerA)
7. device.clear_marker
```

FIG. 5A

```
1. device.playback_start(:content_id =>
   GRIMM_SEASON_1_EPISODE_2)
2. device.wait_for(:playback_started)
3. device.wait_for(:playback_progress_occurred)
```

602 — (brace to line 2)
604 — (brace to line 3)

FIG. 6A

702 →
1. device.playback_start(:content_id => GRIMM_SEASON_1_EPISODE_2)
2. device.enable_progress_event
3. device.wait_for(:playback_started)
4. ...

5. # Implementation of enable_plaback_progress_events method
6. #
7. def enable_progress_event
8. configure(:playback_progress_event => true)
9. end

FIG. 7A

1. # (revised) Implementation of enable_plaback_progress_events method
2. #
3. def enable_progress_events
752 → 4. m = new_marker
5. configure(:playback_progress_event => true)
754 → 6. free_marker(m)
7. end

FIG. 7C

AUTOMATION FRAMEWORK TO REMOTELY CONTROL DEVICES AND PROCESS ASYNCHRONOUS EVENTS

CROSS REFERENCE TO RELATED APPLICATIONS

The present disclosure claims priority to U.S. Provisional App. No. 61/637,172, entitled "AUTOMATION FRAMEWORK TO REMOTELY CONTROL DEVICES", filed Apr. 23, 2012, the contents of which is incorporated herein by reference in its entirety.

BACKGROUND

The number of devices that are available to play streaming media is increasing. These devices include different configurations and capabilities. A media player is typically used to play media that is streamed to the device. However, because of the different configurations and capabilities, the media player may work differently on each device. Thus, a company providing a streaming service must test and maintain the media player on each different device making it increasingly costly to test and maintain the media player on all supported devices.

SUMMARY

In one embodiment, a script starts automatic control of a remote device. The device is automatically controlled to play a video to be streamed to a media player from a streaming service. The script issues a command to the device to automatically control the device where the command causes the device to perform an action related to playing of the video in the media player. The script causes a marker to be set at a position in an event buffer upon issuing of the command. The marker indicates events generated by the device should be stored in the event buffer in relation to the position. The action performed by the device results in one or more events being asynchronously sent to the event buffer where the one or more events are stored in the event buffer based on the position. The script initiates a wait for routine that waits for a target event to occur before execution of the script can continue and receives the one or more events from the event buffer where the one or more events are stored in the event buffer based on the position. The one or more events are analyzed to determine if the target event occurred to allow the script to continue execution where the target event was stored in the event buffer before initiating the wait for routine.

In one embodiment, a non-transitory computer-readable storage medium contains instructions, that when executed, control a computer system to be configured for: starting, by a script, automatic control of a remote device, the device being automatically controlled to play a video to be streamed to a media player from a streaming service; issuing, by the script, a command to the device to automatically control the device, wherein the command causes the device to perform an action related to playing of the video in the media player; causing, by the script, a marker to be set at a position in an event buffer upon issuing of the command, the marker indicating events generated by the device should be stored in the event buffer in relation to the position, wherein the action performed by the device results in one or more events being asynchronously sent to the event buffer where the one or more events are stored in the event buffer based on the position; initiating, by the script, a wait for routine that waits for a target event to occur before execution of the script can continue; receiving, by the script, the one or more events from the event buffer, the one or more events being stored in the event buffer based on the position; and analyzing, by the script, the one or more events to determine if the target event occurred to allow the script to continue execution, wherein the target event was stored in the event buffer before initiating the wait for routine.

In one embodiment, an apparatus includes: one or more computer processors; and a non-transitory computer-readable storage medium comprising instructions, that when executed, control the one or more computer processors to be configured for: starting, by a script, automatic control of a remote device, the device being automatically controlled to play a video to be streamed to a media player from a streaming service; issuing, by the script, a command to the device to automatically control the device, wherein the command causes the device to perform an action related to playing of the video in the media player; causing, by the script, a marker to be set at a position in an event buffer upon issuing of the command, the marker indicating events generated by the device should be stored in the event buffer in relation to the position, wherein the action performed by the device results in one or more events being asynchronously sent to the event buffer where the one or more events are stored in the event buffer based on the position; initiating, by the script, a wait for routine that waits for a target event to occur before execution of the script can continue; receiving, by the script, the one or more events from the event buffer, the one or more events being stored in the event buffer based on the position; and analyzing, by the script, the one or more events to determine if the target event occurred to allow the script to continue execution, wherein the target event was stored in the event buffer before initiating the wait for routine.

The following detailed description and accompanying drawings provide a better understanding of the nature and advantages of particular embodiments.

BRIEF DESCRIPTION OF THE DRAWINGS

FIG. 2 shows an example of an event according to one embodiment.

FIG. 3 shows an example of code for a script that is waiting for an event to occur according to one embodiment.

FIG. 5A shows an example of script for setting event markers according to one embodiment.

FIG. 6A shows code that performs multiple wait_for routines according to one embodiment.

FIG. 7A depicts an example of the script for setting multiple markers according to one embodiment.

FIG. 7C depicts an example of the script to address the situation of using subroutines according to one embodiment.

DETAILED DESCRIPTION

Described herein are techniques for an automation framework. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Overview

Figure 1:
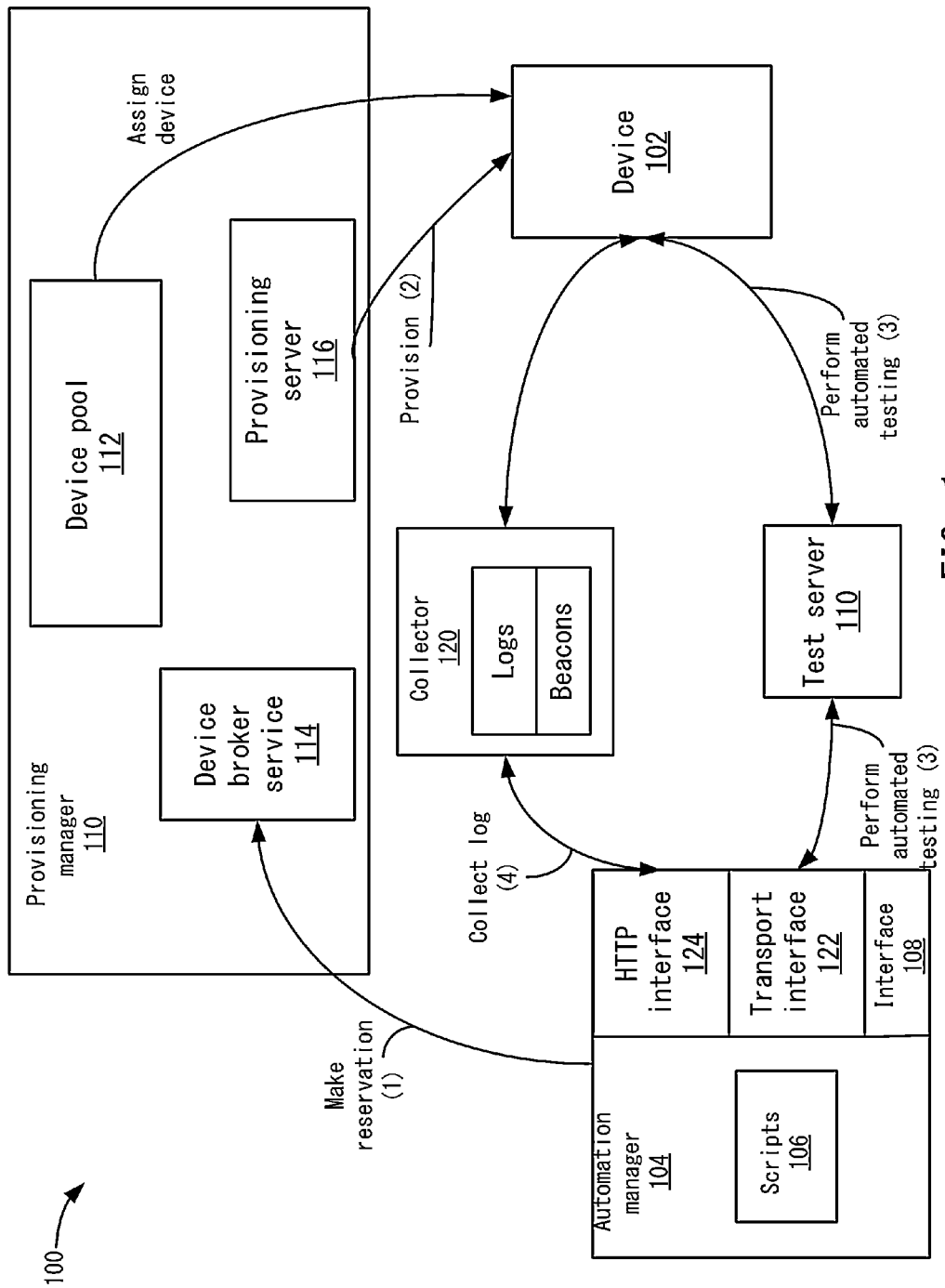
FIG. 1 depicts an example of an automation framework according to one embodiment.

FIG. 1 depicts an example of an automation framework 100 according to one embodiment. Automation framework 100 is used to manage and control devices 102 remotely for the purposes of testing and ad hoc scripting. An automation manager 104 controls devices remotely using scripts 106, such as an interactive shell, and a programmable interface 108, such as an interface in Ruby. Scripts 106 run remotely from devices 102 to control the devices 102 automatically. For example, scripts 106 may be testing how a media player operates within a device 102, which may be situated in a user's living room, or other location. This allows a developer to test or diagnose problems on a remotely located device. In one embodiment, remote may be where script is running separately from device 102 (e.g., in a separate device), and also may be communicating through a wide area network (WAN). Automation framework 100 may also be used in other scenarios described below.

Before beginning the automatic control, device 102 needs to be provisioned. In a step 1, script 106 reserves a device from a device pool 112 for use. Devices 102 include devices that may be used to play a media program, such as a video. For example, devices 102 include a smartphone, tablet computer, television, laptop, and other "living room" devices. For example, script 106 contacts a device broker service 114 to request a device to control. The request may include reservation criteria that define characteristics of a desired device. For example, the criteria may be a smartphone model #. Device broker service 114 then assigns a device for a current session. At the end of the session, the script 106 may release the device, so that it can be used by other scripts later. This described scenario is when a company has a device pool of available devices that can be remotely tested by scripts. Scripts 102 reserve devices to test and only one script 102 may test a device. There may be two considerations in this step: a. If all devices that match the reservation criteria are currently locked by other scripts, device broker service 114 may block the request until a device is available. This may cause script 106 to block or time out. If script 106 has timed out by the time script 106 obtains the requested device, device broker service 114 needs to ensure that the device is returned to the pool; and b. In case there are misbehaving scripts that unnecessarily hold on to hardware device after its use, the reservation will expire after a certain amount of inactivity. In other embodiments, scripts 106 may be testing devices in a user's "living room". For example, a user may be purchased a device and the automation framework is used to troubleshoot any problems.

In a step 2, a provisioning server 116 provisions device 102 according to a requested configuration by script 106. For example, script 106 might be a test script that needs to download a specific piece of code, such as a git branch, for testing on the given hardware device. Additionally, during the provisioning step, automation provisioning manager 110 may also customize device 102 as follows:
    a. Media Player software version
    b. Device firmware version
    c. Beacon service location
    d. Log collector service location
    e. Other service location for service provider Provisioning server 116 may configure the software version of a media player being used on device 102 and the firmware or operating system of device 102. Automation provisioning manager 110 may also configure how events are sent by device 102 to scripts 102 by setting the beacon service location, the log collector service location, and other service location for a service provider. The events will be described in more detail below.

At a step 3, when device 106 is provisioned, device 102 connects to a test server 116, such as an Extensible Messaging and Presence Protocol (XMPP) server, using an automation addressing scheme. This is a messaging protocol that sends messages between device 106 and automation manager 104. In this case, device 102 connects to test server 116 using an address received from provisioning server 116. Although automatic provisioning is discussed, a user can manually provision a device 102. For example, a user can start controlling a device 102 without having to add it to device pool 112, which is managed by device broker service 114 and provisioning server 116. Also, script 106 connects to test server 116 using an address received from device broker service 114. Once connecting to test server 116, particular embodiments may begin the automatic testing.

Script 106 sends commands to device 102 via test server 110. Device 102 may acknowledge each command with a response. The commands may cause device 102 to perform some action. For example, the command may be commands to start playing a video using the media player, stop playing a video, perform certain trick play commands for a video, etc. In general, the commands may be causing actions to be performed with respect to the media player.

When performing actions in response to the commands, device 102 may generate certain events. For example, events may be generated when a video finishes playing. One event may be an event that script 106 needs to receive to continue the automation testing. For example, script 106 may be executing and waiting for certain events to occur on device 102. Because of the nature of the testing, script 106 does not know when the event will occur. For example, script 102 does not know when the media player will finish playing the video. This may be because a streaming service separate from device 102 is streaming the video to the media player. Various unknown and variable conditions may result, such as bandwidth variations, that make it uncertain when the media player will finish playing the video. When script 106 receives notification that the event occurs, script 102 may then stop waiting and continue to execute, such as by sending more commands.

Other types of events may be logs events or beacons. As part of session establishment, particular embodiments can reconfigure the media player in device 102 to start sending log events and beacons to collector 120. After an automation session, particular embodiments then query the log collection service to retrieve all the log entries belonging to the automation session. These log entries can be used for debugging or test assertion purposes. These events may not be needed by script 106 to continue executing. Device 102 sends these events to a collector 120, which may be located in a separate entity from test server 118 or be located in test server 118.

Beacons may be web requests that are generated to document the actions taken at device 102. For example, when a browser requests information from a website, the beacon may aggregate information, such as the IP address of the computer being used; the time the material was viewed; the type of browser that was used, the type of action taken by the user, etc. A log event may be any other events that occur, such as a video stops playing. In one embodiment, events may be sent using different protocols. For example, beacons and log events may be sent using HyperText Transfer Protocol (HTTP) to an HTTP client 124 in interface 108 of automation manager 104.

Script 106 and device 102 communicate using a bi-directional, asynchronous messaging bus over HTTP. In one embodiment, device 102 sends the events through test server 118 through a transport interface 122 in interface 108 of automation manager 104. In one embodiment, a messaging protocol is used, such as XMPP. In one embodiment, devices 102, such as devices referred to as "living room" devices (e.g., those devices located on a home or local area network) may not be allowed to open up network ports for security reasons. Also, particular embodiments aim to enable automation protocol across network address translation (NAT) and firewalls that exist in networks, such as home networks. Once a protocol session is established, script 106 can sends control commands to the connected device 102, and device 102 should be able to initiate event notification to script 106. The communication between device 102 and script 106 may be an asynchronous transmission of messages (meaning, either end point should be able to send a message off without having to wait for response). The asynchronous transmission is used because script 106 is executing remotely from device 102 and does not know when events will occur at device 102. As will be discussed below, event handling is needed to ensure proper execution of script 106.

At a step 4, once automation run is finished, script 106 can retrieve any beacons and log entries belonging to the current session from collector 120. This information can be used to make test assertions or to aid debugging.

Handling Device Events

As discussed above, communication between script 106 and device 102 may be asynchronous. Script 106 issues commands to control devices 102 and events occur due to the controlling. At some points in the script 106, lines of code may be waiting for events to occur to continue executing. However, events might happen before the script starts looking for the event (that is, the script has not reached the line of code that is looking for the event). When this occurs, script 106 may run in an infinite loop waiting for the event to occur because the event has already occurred and will never be encountered. Particular embodiments provide event handling for events that might happen before software code is executed that waits for an event to occur. The event handling is performed to ensure that script 102 receives the events it is waiting for at the appropriate time.

Once script 106 and device 102 establish a connection, device 102 sends events back to script 106 during the automated testing. For example, script 106 may automatically control a media player to play a video from a streaming service. While being automatically controlled, certain events may occur, such as:

ActivationCodeLoaded—device activation code loaded on screen of the media player.
ActivationComplete—device activation process complete.
PlaybackAdStart—an ad started playing during a video being played in the media player.
PlaybackPlaying—playback of a video started in the media player.
PlaybackFinished—playback of a video finished in the media player.
PlaybackProgressOccurred—periodic event that fires to indicate progress of the video being played in the media player.

Each of these events is defined using the similar mechanism as commands. For example, FIG. 2 shows an example of an event according to one embodiment. This event may be the PlaybackProgressOccurred event that is a periodic event that fires to indicate progress of the video being played in the media player. At 202, the PlaybackProgressOccurred event is identified as "playback_progress_occurred". Whenever the "playback_progress_occurred" event is received, the event contains a content_id shown at 204 and a current_position shown at 206. The content_id identifies the content being played by the media player and the current_position is the position of the video during playback.

Script 102 may register a callback to receive the events. The following is an example callback registration:

```
device.on_event(:all_events, Bender::Message::EventBase) do |event|
  puts "event received: #{event}"
end
```

The above code registers an event handler :all_events that match all events, and prints them out. (in one embodiment, all events inherit from EventBase). Particular embodiments can register multiple callbacks for the same event. So, in addition to the above event, particular embodiments could register another callback for a specific event as follows:

```
$ad_count = 0
device.on_event(:ad_count, Bender::Message::Event::PlaybackAdStart)
do |event|
  $ad_count += 1
end
```

The above code will count how many times the PlaybackAdStart event has fired. Note that the |event| object that gets passed in is an instance of the event class that particular embodiments are capturing. So, particular embodiments can access details as follows:

```
device.on_event(:progress, Bender::Message::Event::PlaybackProgress)
do |event|
  puts event.data.content_id
  puts "At %f second mark" % (event.data.current_position.to_f / 1000.0)
end
```

The event handler names (such as :all_events, :ad_count, and :progress) are there so that particular embodiments can later remove an event handler if needed, using remove_on_event API. Here is an example:
device.remove_on_event(:progress)

After registering to receive events, script 106 includes code that may be waiting for an event to occur for script 106 to continue execution. That is, script 106 controls the execution flow of the code based on events received. Interface 108 provides a wait_for application programmer interface (API) that allows script 106 to block (e.g., wait) until certain event is fired from device 102. This causes script 106 to wait until the event occurs.

FIG. 3 shows an example of code for script 106 that is waiting for an event to occur according to one embodiment. For example:

At 300, script 106 sends a command for staring playback of a media program in a media player. After sending the command, script 106 looks for an event to occur on device 102. For example, at 302, a line 3 of script 106 is waiting for the very first PlaybackFinished (playback_finished) event before continuing to line 4. Script 106 blocks inside the wait_for API here. Due to the asynchronous nature of the communication between script 106 and device 102, there may be no guarantee that events caused by an issued command will arrive after the wait_for routine gets a chance to run. For example, PlaybackFinished event might arrive between line 2 and line 3 in the code (as shown at 304 before wait_for API call), and when script 106 executes the wait_for routine on line 3, script 106 might get stuck forever waiting for an event that already has occurred between lines 2 and 3. However, particular embodiments provide an event buffer facility to address this situation.

Figure 4A:
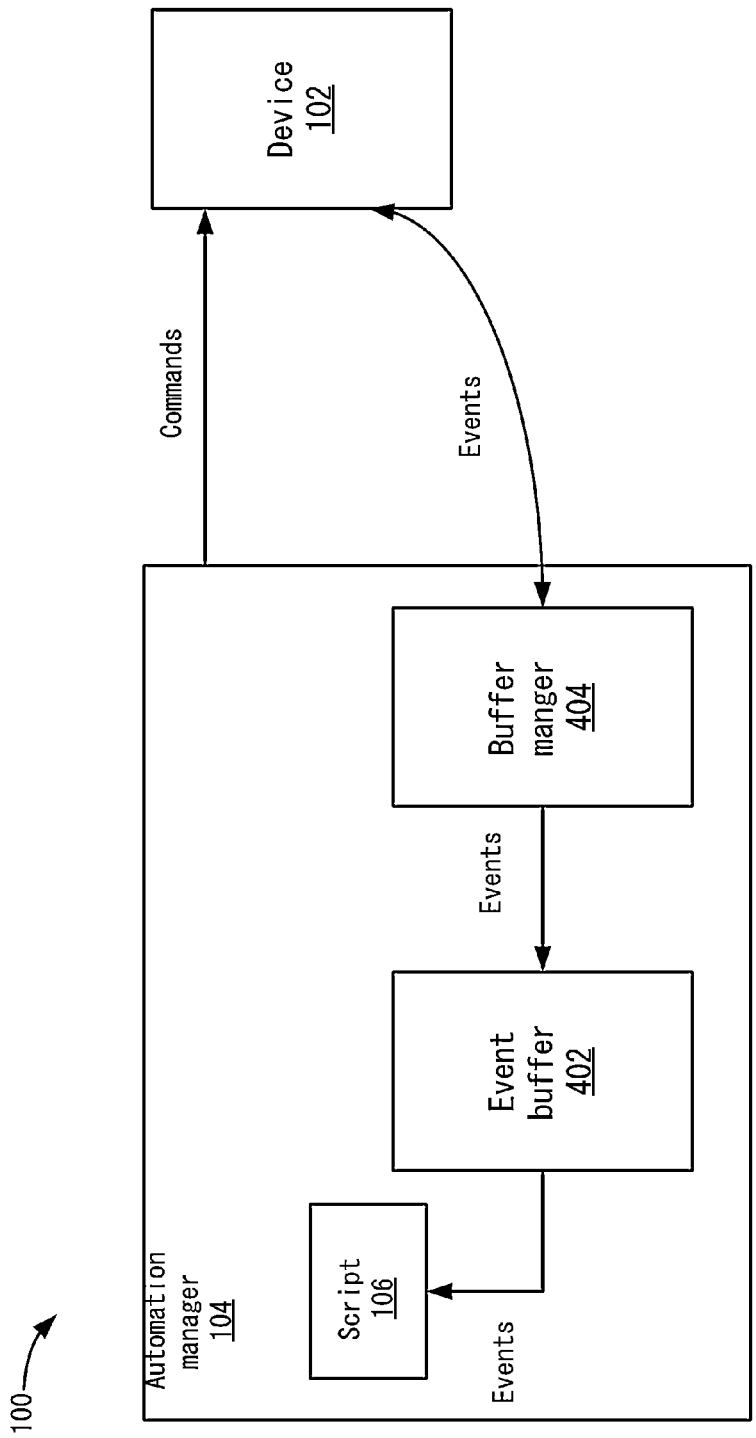
FIG. 4A depicts a more detailed example of an automation manager including an event buffer according to one embodiment.

FIG. 4A depicts a more detailed example of automation manager 104 that includes an event buffer 402 according to one embodiment. Script 106 sends commands to device 106 in which script 106 expects device 102 to generate events. In response to the commands, device 102 sends events back to script 106. A buffer manager 404 automatically captures events that arrive from device 102 into event buffer 402. Buffer manager 404 then determines when to deliver the events to script 106 to ensure proper execution of the code. Referring to FIG. 3, buffer manager 404 starts capturing events as soon as the playback_start command is issued on line 2. When wait_for API gets invoked on line 3, using event buffer 402, the wait for API can still examine any events that may have occurred between line 2 and line 3, making sure that any PlaybackFinished event is recognized.

In addition to event buffer 402, markers may be used to determine when to capture events. In some embodiments, buffer manager 404 flushes event buffer 402 automatically at appropriate points over the course of script execution. In one example, unless particular embodiments use event markers, buffer manager 404 flushes event buffer 402 every time script 106 issues a new command. To avoid the flushing at every command, particular embodiments use event markers.

Figure 4B:
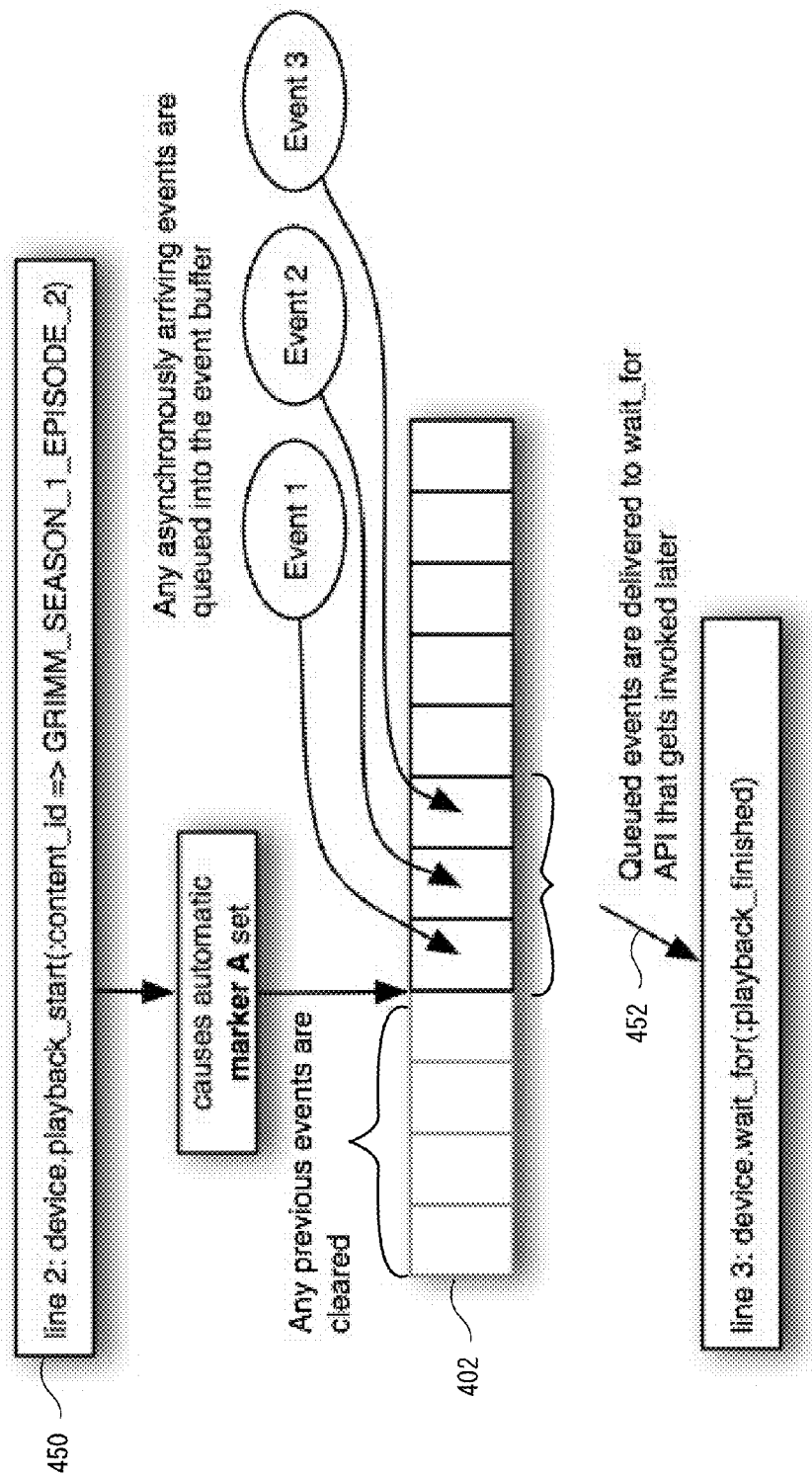
FIG. 4B shows the setting of event markers and use of an event buffer according to one embodiment.

FIG. 4B shows the setting of event markers and use of event buffer 402 according to one embodiment. At 450, line 2 of script 106 is executed and sets marker A. This causes buffer manager 404 to queue any asynchronously arriving events in event buffer 402. For example, buffer manager 404 inserts events 1, 2, and 3 into consecutive slots in event buffer 402. At 452, buffer manager 404 delivers the queued events from event buffer 402 to the wait_for API, which script 106 invoked after the events that were received.

In one example, the wait_for API is waiting for an event that indicates the playback of a video has finished in a media player. However, due to the asynchronous nature of the automation testing, the media player may finish playing the video before script 106 invokes the wait_for API. Thus, by storing the events in event buffer 402, the wait_for API correctly receives the event when invoked.

In some cases, script 106 needs to capture events across multiple commands. In this case, buffer manager 404 sets event markers through a set_marker API. With this API, particular embodiments can explicitly control event buffer 402. In contrast to the example in FIGS. 3A and 3B where the marker was automatically set and then events would be cleared when script 106 issued the next command, script 106 can explicitly set commands to avoid the clearing.

FIG. 5A shows an example of script 106 for setting event markers according to one embodiment. At 502, script 106 executes a set marker routine to set marker A on line 2 just before script 106 issues a media play command—device-.playback_started command—on line 3 at 504. Buffer manager 404 will flush any events currently in event buffer 402, and then start accumulating all subsequent events. Script 106 issues a new seek command on line 4 at 506. This causes the media player to seek to a different location in the video. Because script 106 set marker A explicitly, buffer manager 404 does not flush event buffer 402. Also, script 106 then performs other operations represented as complicated_operation on line 5 at 508. Any of the commands or operations may cause device 102 to issue events. Any events received after marker A are preserved in event buffer 402. At 510, when the wait_for API call is encountered on line 6, the wait_for API causes the delivery of the events in event buffer 402 to script 106. When the wait_for API call returns, buffer manager 404 can now safely flush all events that have been accumulating in event buffer 402 by calling the method device.clear_marker. Buffer manager 404 can flush the events in event buffer 402 because all possible events that the wait_for API call could be waiting for would have been delivered to script 106 no matter if the events occurred before the API was executed. This ensures that the wait_for API receives the event that occurred even if the event occurred before line 6 was reached in script 106.

Figure 5B:
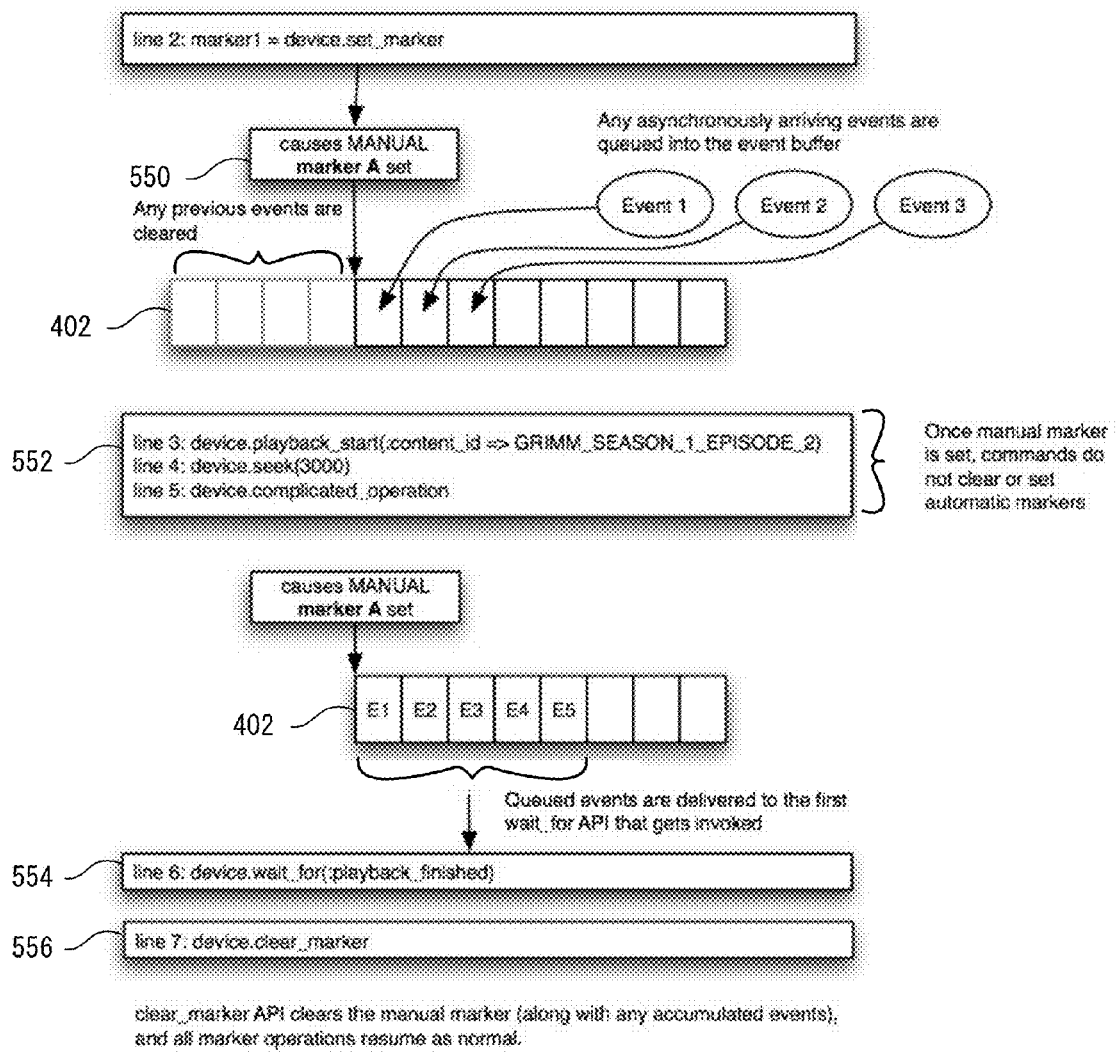
FIG. 5B shows an example for handling events in the event buffer over multiple commands according to one embodiment.

FIG. 5B shows an example for handling events in event buffer 402 over multiple commands according to one embodiment. At 550, script 106 explicitly (e.g., manually) sets marker A in event buffer 402. The marker is manual in that a line of code specifically sets a marker A. Buffer manager 404 may also clear any previous entries in event buffer 402. Buffer manager 404 then receives events asynchronously from device 102 and stores the events in event buffer 402. At 552, script 106 executes multiple commands. The commands do not set markers or clear markers.

At 554, script 106 calls the wait_for routine that is waiting for a playback_finished event, which is when the media player finishes playing the video. At this point, buffer manager 404 delivers the events in event buffer 402 to the wait_for API. As shown, events E1-E5 are delivered. The wait_for routine thus receives all events that may have occurred after script 106 set marker A. This ensures that the wait_for routine receives the event it is looking for even if it occurred before script 106 executed line 6. Because the marker is a manual marker, script 106 may want to clear the marker when events no longer need to be saved in event buffer 402. At 556, script 106 clears marker A and any events in event buffer 402.

Sometimes, script 106 may want to call wait_for routines multiple times after issuing a command. It may be desirable that only events received after the first wait_for routine is executed be delivered to the second wait_for routine. In this case, the events received before the first wait_for routine is executed may not be relevant. Script 106 allows multiple wait_for routines by keeping track of the last processed event within the current marker. FIG. 6A shows code that performs multiple wait_for routines according to one embodiment. At 602, script 106 includes a first wait_for routine that is waiting for playback to start. At 604, script 106 includes a second wait_for routine that is waiting for the playback progress event. In this case, script 106 is waiting for the media player to send information for the status of the playback of the media program while the media player is playing the media program.

Figure 6B:
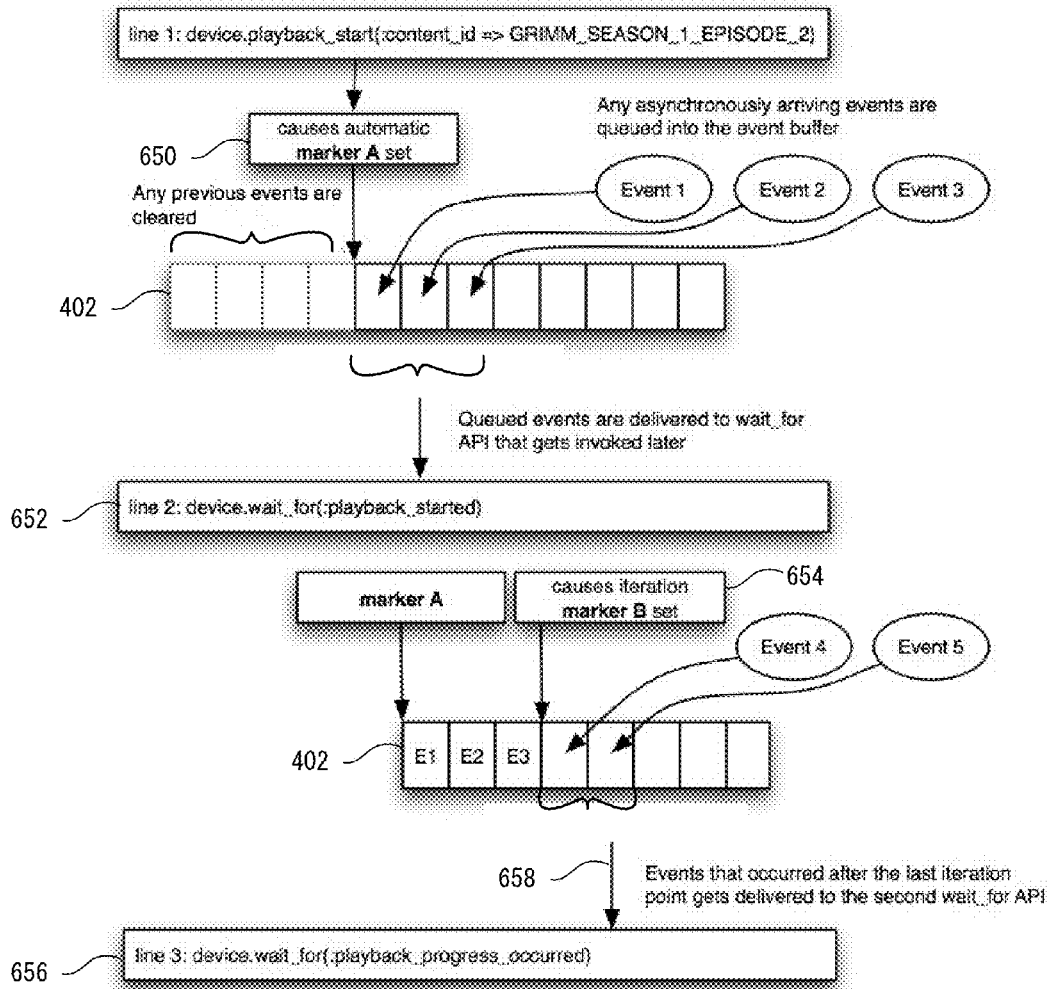
FIG. 6B shows the operation of the event buffer when multiple wait_for routines are issued according to one embodiment.

FIG. 6B shows the operation of event buffer 402 when multiple wait_for routines are issued according to one embodiment. Buffer manager 404 uses an iteration pointer within event buffer 402 to keep track of the last delivered event for a wait_for routine. At 650, script 106 automatically sets marker A in event buffer 402. Buffer manager 404 may also clear any previous entries in event buffer 402. Buffer manager 404 then receives events 1-3 asynchronously from device 102 and stores the events in event buffer 402.

At 652, script 106 calls a first wait_for routine (device.wait_for(:playback_started)) that is waiting for a playback_started event, which is when the media player starts playing the video. At this point, buffer manager 404 delivers the events in event buffer 402 to the wait_for routine. As shown, events 1-3 are delivered. The wait_for routine thus receives all events that may have occurred before script 106 issued the command and after marker A was set. This ensures that the wait_for routine receives the event it is looking for even if it occurred before script 106 executed line 2.

At 654, buffer manager 404 sets an iteration marker B. The iteration marker indicates in buffer 402 where the last event was sent to the last wait_for routine. The iteration marker may be automatically set when multiple wait_for routines are issued without an intervening command. Buffer manager 404 then receives events 4 and 5 asynchronously from device 102 and stores the events in event buffer 402. At 656, script 106 calls a second wait_for routine (device.wait_for(:playback_progress_occurred)) that is waiting for a progress report of the playback of the video, which is in the middle of when the media player is playing the video. At 658, buffer manager 404 delivers the events in event buffer 402 to the wait_for routine. As shown, events 4-5 are delivered, but not events 1-3. In this case, buffer manager 404 determines where the iteration marker B was set and delivers events from that point on in the event buffer 402. The wait_for routine thus receives all events that may have occurred before script 106 issued the command and after marker B was set. This ensures that the wait_for routine receives the event it is looking for even if it occurred before script 106 executed line 3.

Figure 7B:
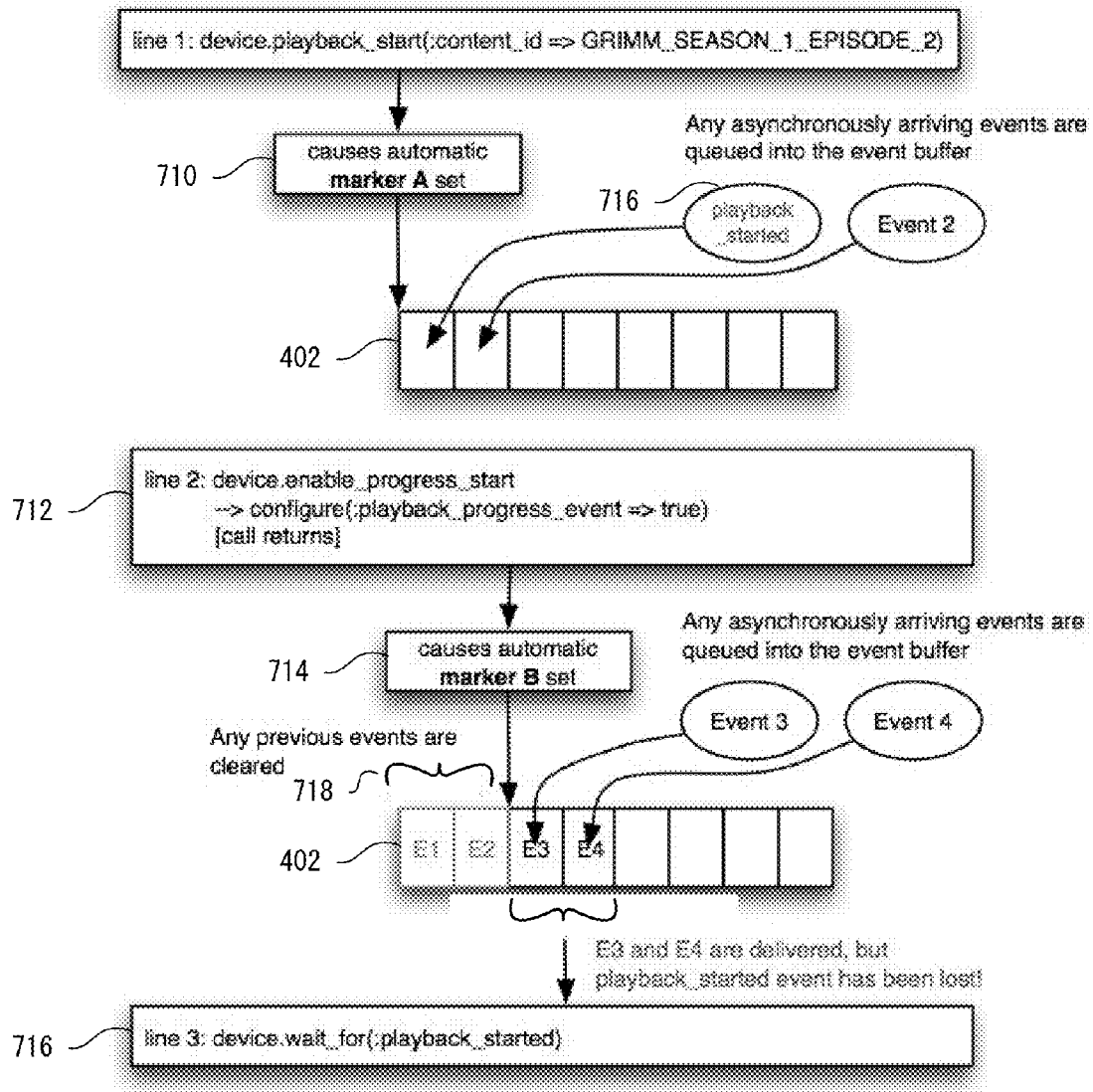
FIG. 7B shows the operation of the script of FIG. 7A according to one embodiment.

Finally, sometimes it is necessary to set and clear a marker for a limited scope. For example, particular embodiments may want to send a command within a subroutine, but does not want to affect the calling code. FIG. 7A depicts an example of script 106 for setting multiple markers according to one embodiment. At 702, script 106 is reconfiguring device 102 by calling a subroutine "enable_progress_event". Inside the enable_progress_event subroutine, particular embodiments are causing a new command-response interaction, which will normally clear a marker that has been set, potentially breaking the calling code by clearing the events that arrive while the subroutine is running. Since commands and other marker operations are happening inside a subroutine, it is difficult for the caller code to know that this is even happening. FIG. 7B shows the operation of script 106 of FIG. 7A according to one embodiment. At 710, script 106 causes a marker A to be set. Then, buffer manager 404 receives events from device 102 and stores them in event buffer 402. In one example, the events are a playback_started event that indicates a media player has started playback of an event and also an "Event 2". At 712, script 106 calls a subroutine that performs another command. The performing of the command causes a marker B to be set at 714 and any events received previous to marker B are cleared. Event buffer 402 then receives events 3 and 4.

When the subroutine ends, script 106 returns to the calling code and executes a wait_for routine at 716. This command is waiting for a playback started command indicating that the media player started playback of the video. This event was received at 718 before the subroutine was called. However, the execution of commands in the subroutine caused another marker to be set, which cleared the playback started command from buffer 402 as shown at 718. Thus, the wait_for routine does not receive the playback started event.

In order to avoid the situation where commands run within a subroutine clear markers set for a calling routine, event manager 404 provides a mechanism to save and restore the caller's marker. This allows the calling routine to avoid losing track of events, even when the calling routine calls subroutines that may set and clear markers themselves. FIG. 7C depicts an example of script 106 to address the situation of using subroutines according to one embodiment.

FIG. 7C includes a new marker call and a free marker call. At 752, the new_marker call sets a new marker within a subroutine, and at 754, the free_marker call free the new marker within the subroutine. The use of this call defines an event scope, and allows buffer manager 404 to preserve any events that happen outside the scope, independent of markers being used within the scope.

Figure 7D:
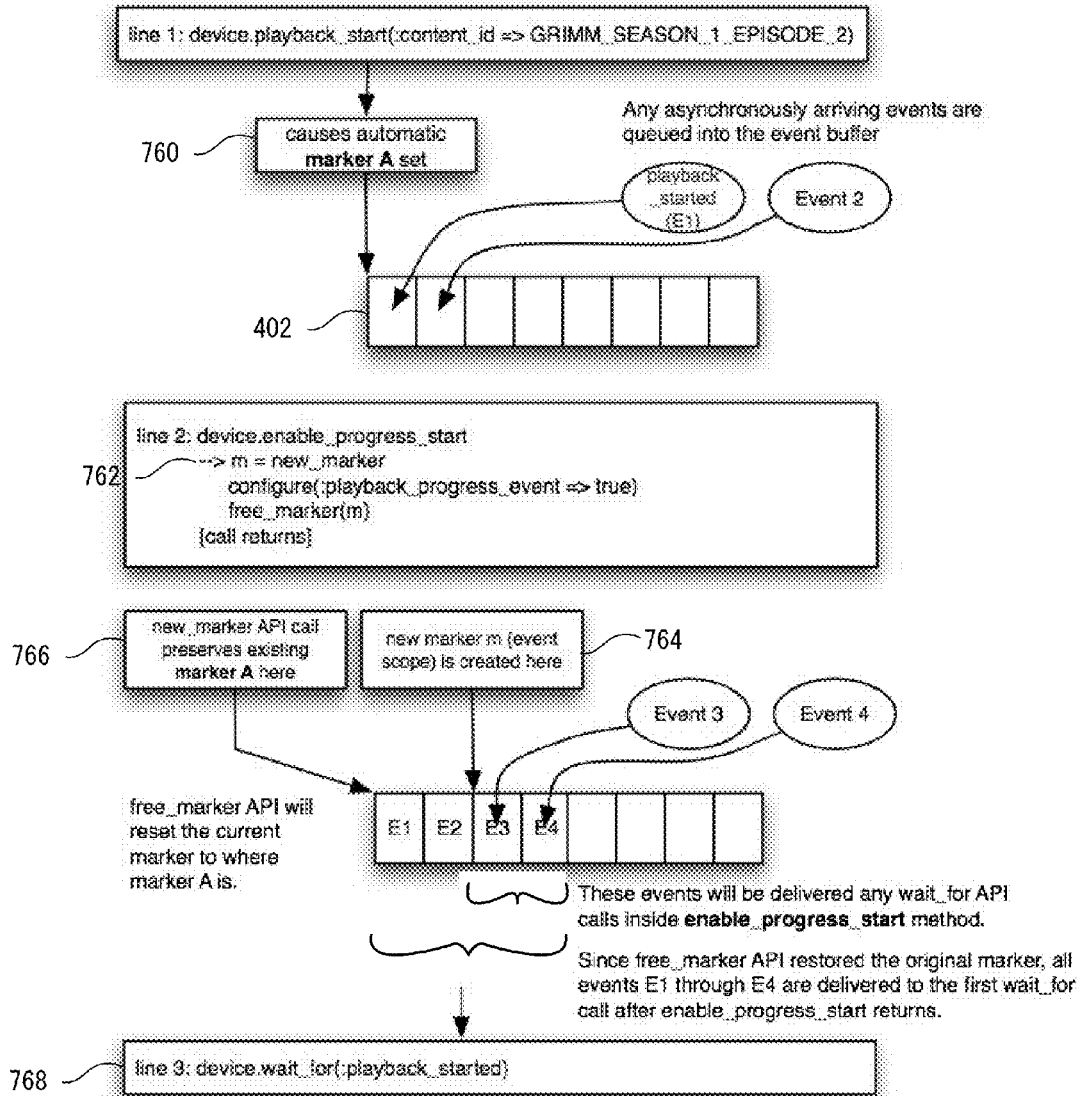
FIG. 7D shows the use of markers within a subroutine according to one embodiment.

FIG. 7D shows the use of markers within a subroutine according to one embodiment. Aliases for new_marker/free_marker APIs are save_marker/restore_marker. These pairs can be nested within any level of subroutines calls providing a safe mechanism to preserve any expectations around event buffers in the caller's context. For example, at 760, script 106 sets a marker A. Then, as above, buffer manager 404 receives the playback_start event and event 2 from device 102 and stores them in event buffer 402. At 762, script 106 explicitly sets a new_marker m. As shown at 764, buffer manager 404 sets the new marker m in buffer 402. Also, at 766, buffer manager 404 preserves the marker A set by the calling routine.

After setting marker m, buffer 402 receives events 3 and 4. When a wait_for event is encountered within the subroutine, buffer 402 delivers the events after marker m to script 106. Thus, buffer 402 delivers events 3 and 4, but not events 1 and 2. Also, buffer manager 404 has not cleared events 1 and 2 from buffer 402 even though wait for routines have been issued in the subroutine and events from event buffer 402 have been delivered.

When the subroutine returns, at 768, buffer 402 may deliver all events within buffer 402 to script 106 (or just the events before new marker m). In this case, the wait_for routine playback_started receives the playback started event properly.

The automation framework allows users to control TV devices remotely and programmatically, significantly improving development and testing efficiency. Such efficiency gain can also be extended to other companies or users in the form of software development kit that contains components of the automation framework to facilitate a TV certification process, which is one of the use cases of automation framework. Also, particular embodiments can be leveraged for use in end-user scenarios in production. Example scenarios include the "companion device experience" in which particular embodiments enable the end users to interact with a media player on their TV from their tablet or phone devices. Another scenario might be to enable a customer support agent to diagnose problems by directly connecting to TV devices in the customer's living room.

Figure 8:
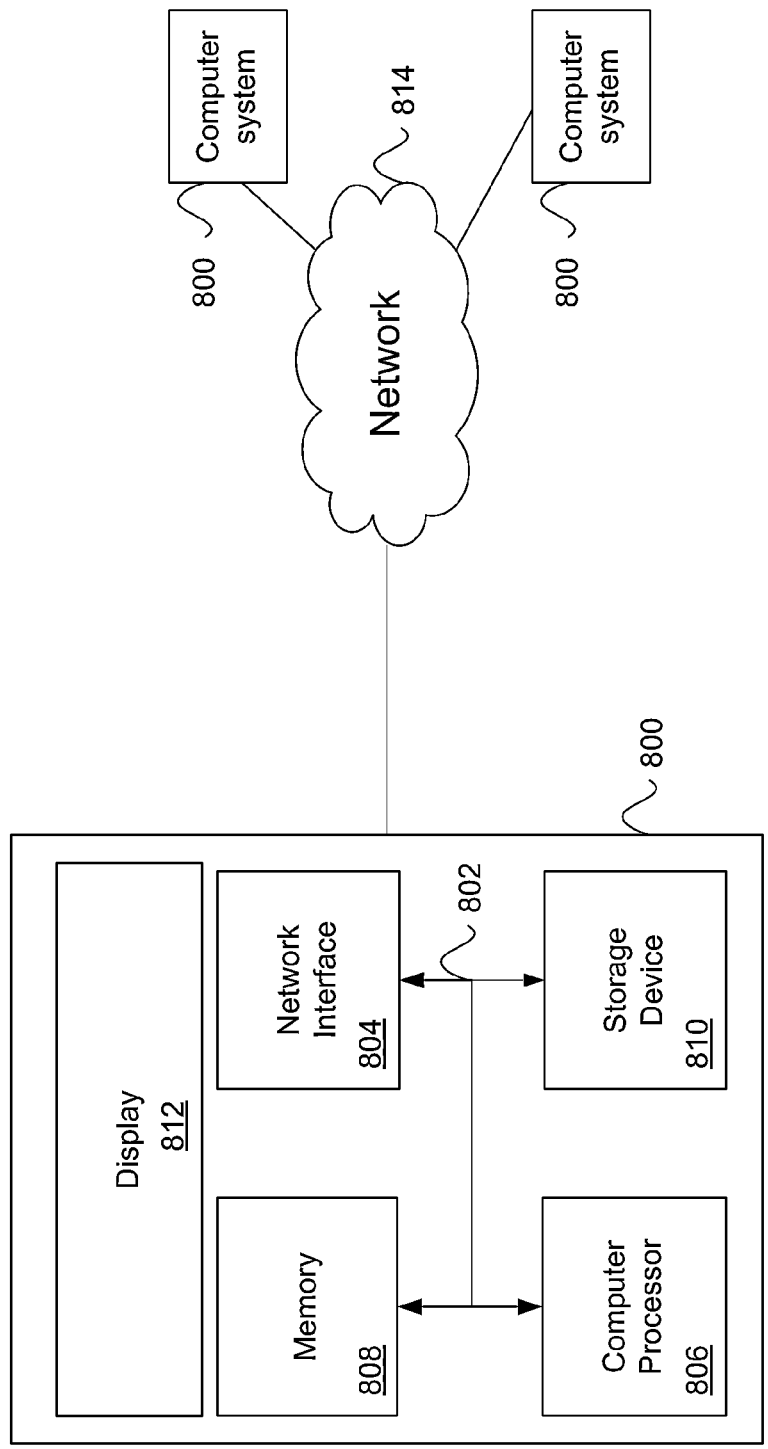
FIG. 8 illustrates an example of a special purpose computer system configured with automation framework according to one embodiment.

FIG. 8 illustrates an example of a special purpose computer system 800 configured with automation framework according to one embodiment. Computer system 800 includes a bus 802, network interface 804, a computer processor 806, a memory 808, a storage device 810, and a display 812.

Bus 802 may be a communication mechanism for communicating information. Computer processor 804 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The computer-readable storage medium contains instructions for controlling a computer system to be operable to perform functions described by particular embodiments. The instructions, when executed by one or more computer processors, may be operable to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of particular embodiments may be distributed across computer systems 800 through network 814.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    starting, by a script, automatic control of a remote device, the device being automatically controlled to play a video to be streamed to a media player from a streaming service;
    issuing, by the script, a command to the device to automatically control the device, wherein the command causes the device to perform an action related to playing of the video in the media player;
    causing, by the script, a marker to be set at a position in an event buffer upon issuing of the command, the marker indicating events generated by the device should be stored in the event buffer in relation to the position, wherein the action performed by the device results in one or more events being asynchronously sent to the event buffer where the one or more events are stored in the event buffer based on the position;
    initiating, by the script, a wait for routine that waits for a target event to occur before execution of the script can continue;
    receiving, by the script, the one or more events from the event buffer, the one or more events being stored in the event buffer based on the position; and
    analyzing, by the script, the one or more events to determine if the target event occurred to allow the script to continue execution, wherein the target event was stored in the event buffer before initiating the wait for routine.

2. The method of claim 1, wherein the one or more events are generated by the media player based on the video being streamed to the media player.

3. The method of claim 1, wherein any events in the event buffer are cleared from the event buffer automatically when the marker is set.

4. The method of claim 1, wherein unless the marker is set, all events in the event buffer are cleared when a new command is issued.

5. The method of claim 1, wherein the marker is automatically set upon issuing the command.

6. The method of claim 1, wherein the marker is explicitly set by the script and explicitly cleared.

7. The method of claim 6, wherein issuing the command comprises sending multiple commands where the event buffer is not cleared until explicitly cleared due to the marker being explicitly set.

8. The method of claim 1, wherein the marker comprises a first marker, the target event comprises a first target event, the position comprises a first position, the one or more events comprise one or more first events, and the wait for routine comprises a first wait for routine, the method further comprising:
    causing a second marker to be set at a second position in the event buffer, the second marker indicating one or more second events generated by the device should be stored in the event buffer in relation to the second position;

initiating a second wait for routine that waits for a second target event to occur before execution of the script can continue;

receiving the one or more second events from the event buffer, the one or more second events being stored in the event buffer based on the second position; and analyzing the one or more second events to determine if the second target event occurred to allow the script to continue execution, wherein the second target event was stored in the event buffer before initiating the second wait for routine.

9. The method of claim 8, wherein the one or more first events are not cleared from the event buffer when the second marker is set due to the second wait for routine.

10. The method of claim 8, wherein the second wait for routine is initiated by the script without any additional commands being executed after the first wait for routine.

11. The method of claim 1, wherein the marker comprises a first marker, the target event comprises a first target event, the position comprises a first position, the one or more events comprise one or more first events, and the wait for routing comprises a first wait for routine, the method further comprising:

calling a subroutine in the script;

causing a second marker to be set at a second position in the event buffer, the second marker indicating one or more second events generated by the device should be stored in the event buffer in relation to the second position;

initiating a second wait for routine that waits for a second target event to occur before execution of the script can continue, the second wait for routine being executed in the script before the first wait for routine;

receiving the one or more second events from the event buffer, the one or more second events being stored in the event buffer based on the second position;

analyzing the one or more second events to determine if the second target event occurred to allow the script to continue execution, wherein the second target event was stored in the event buffer before initiating the second wait for routine;

freeing the second marker such that the second marker is removed; and receiving the one or more first events and the one or more second events at the first wait for routine.

12. The method of claim 11, wherein the second marker is explicitly set and freed.

13. The method of claim 11, wherein the one or more first events and the one or more second events are analyzed to determine if the first target event occurred within the one or more first events and the one or more second events.

14. A non-transitory computer-readable storage medium containing instructions, that when executed, control a computer system to be configured for:

starting, by a script, automatic control of a remote device, the device being automatically controlled to play a video to be streamed to a media player from a streaming service;

issuing, by the script, a command to the device to automatically control the device, wherein the command causes the device to perform an action related to playing of the video in the media player;

causing, by the script, a marker to be set at a position in an event buffer upon issuing of the command, the marker indicating events generated by the device should be stored in the event buffer in relation to the position, wherein the action performed by the device results in one or more events being asynchronously sent to the event buffer where the one or more events are stored in the event buffer based on the position;

initiating, by the script, a wait for routine that waits for a target event to occur before execution of the script can continue;

receiving, by the script, the one or more events from the event buffer, the one or more events being stored in the event buffer based on the position; and analyzing, by the script, the one or more events to determine if the target event occurred to allow the script to continue execution, wherein the target event was stored in the event buffer before initiating the wait for routine.

15. The non-transitory computer-readable storage medium of claim 14, wherein the marker is automatically set upon issuing the command.

16. The non-transitory computer-readable storage medium of claim 14, wherein:

the marker is explicitly set by the script and explicitly cleared, and issuing the command comprises sending multiple commands where the event buffer is not cleared until explicitly cleared due to the marker being explicitly set.

17. The non-transitory computer-readable storage medium of claim 14, wherein the marker comprises a first marker, the target event comprises a first target event, the position comprises a first position, the one or more events comprise one or more first events, and the wait for routine comprises a first wait for routine, the method further comprising:

causing a second marker to be set at a second position in the event buffer, the second marker indicating one or more second events generated by the device should be stored in the event buffer in relation to the second position;

initiating a second wait for routine that waits for a second target event to occur before execution of the script can continue;

receiving the one or more second events from the event buffer, the one or more second events being stored in the event buffer based on the second position; and analyzing the one or more second events to determine if the second target event occurred to allow the script to continue execution, wherein the second target event was stored in the event buffer before initiating the second wait for routine.

18. The non-transitory computer-readable storage medium of claim 17, wherein the one or more first events are not cleared from the event buffer when the second marker is set due to the second wait for routine.

19. The non-transitory computer-readable storage medium of claim 14, wherein the marker comprises a first marker, the target event comprises a first target event, the position comprises a first position, the one or more events comprise one or more first events, and the wait for routing comprises a first wait for routine, the method further comprising:

calling a subroutine in the script;

causing a second marker to be set at a second position in the event buffer, the second marker indicating one or more second events generated by the device should be stored in the event buffer in relation to the second position;

initiating a second wait for routine that waits for a second target event to occur before execution of the script can continue, the second wait for routine being executed in the script before the first wait for routine;

receiving the one or more second events from the event buffer, the one or more second events being stored in the event buffer based on the second position;

analyzing the one or more second events to determine if the second target event occurred to allow the script to continue execution, wherein the second target event was stored in the event buffer before initiating the second wait for routine;

freeing the second marker such that the second marker is removed; and receiving the one or more first events and the one or more second events at the first wait for routine.

20. An apparatus comprising:

one or more computer processors; and a non-transitory computer-readable storage medium comprising instructions, that when executed, control the one or more computer processors to be configured for:

starting, by a script, automatic control of a remote device, the device being automatically controlled to play a video to be streamed to a media player from a streaming service;

issuing, by the script, a command to the device to automatically control the device, wherein the command causes the device to perform an action related to playing of the video in the media player;

causing, by the script, a marker to be set at a position in an event buffer upon issuing of the command, the marker indicating events generated by the device should be stored in the event buffer in relation to the position, wherein the action performed by the device results in one or more events being asynchronously sent to the event buffer where the one or more events are stored in the event buffer based on the position;

initiating, by the script, a wait for routine that waits for a target event to occur before execution of the script can continue;

receiving, by the script, the one or more events from the event buffer, the one or more events being stored in the event buffer based on the position; and analyzing, by the script, the one or more events to determine if the target event occurred to allow the script to continue execution, wherein the target event was stored in the event buffer before initiating the wait for routine.

* * * * *